United States Patent [19]
Okano et al.

[11] Patent Number: 6,009,278
[45] Date of Patent: *Dec. 28, 1999

[54] VIBRATION PREVENTING DEVICE AND PHOTOGRAPHING APPARATUS HAVING THE VIBRATION PREVENTING FUNCTION

[75] Inventors: Hiroshi Okano, Tokyo; Nobuhiko Terui, Ichikawa; Tadao Kai, Kawasaki; Yukio Uemura, Musashino, all of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/482,848

[22] Filed: Jun. 7, 1995

[30] Foreign Application Priority Data

| Jun. 7, 1994 | [JP] | Japan | 6-125523 |
| Sep. 7, 1994 | [JP] | Japan | 6-213749 |

[51] Int. Cl.$^6$ .............................. G03B 17/00; G03B 7/26
[52] U.S. Cl. ............................................. 396/55; 396/302
[58] Field of Search ..................................... 354/410, 430, 354/70, 195.12, 202, 289.11, 289.1; 348/208; 396/52, 53, 54, 55, 535, 302; 359/554, 555, 556, 557

[56] References Cited

U.S. PATENT DOCUMENTS

| 5,109,249 | 4/1992 | Kitajima | 354/430 |
| 5,146,263 | 9/1992 | Kataoka | 354/430 |
| 5,175,580 | 12/1992 | Shiomi | 354/410 |
| 5,208,622 | 5/1993 | Kawano | 354/82 |
| 5,237,363 | 8/1993 | Okada et al. | 354/412 |
| 5,266,981 | 11/1993 | Hamada et al. | 354/400 |
| 5,270,767 | 12/1993 | Hamada et al. | 354/430 |
| 5,307,113 | 4/1994 | Egawa | 354/430 |
| 5,335,032 | 8/1994 | Onuki et al. | 354/195.1 |
| 5,379,088 | 1/1995 | Ueda et al. | 354/402 |
| 5,465,130 | 11/1995 | Eguchi | 354/195.1 |
| 5,598,242 | 1/1997 | Omi et al. | 396/55 |
| 5,606,384 | 2/1997 | Yamazaki et al. | 396/55 |
| 5,623,326 | 4/1997 | Okano | 396/55 |
| 5,809,353 | 9/1998 | Hirano | 396/55 |

FOREIGN PATENT DOCUMENTS 3-237411  10/1991  Japan .

*Primary Examiner*—Eddie C. Lee
*Assistant Examiner*—Christopher E. Mahoney

[57] ABSTRACT

A vibration preventing device is provided with a vibration preventing mode selector capable of selecting a vibration preventing mode in which vibration prevention driving is effected during exposure and a non-vibration preventing mode. Also provided are a vibration prevention start selector for selecting whether vibration prevention control is to be started, and a vibration prevention driving start instructing portion for instructing the start of vibration prevention. Start of vibration prevention driving occurs driving even before the start of exposure when the vibration preventing mode selector selects the vibration preventing mode and the vibration prevention start selector selects the start of the vibration prevention control.

10 Claims, 11 Drawing Sheets

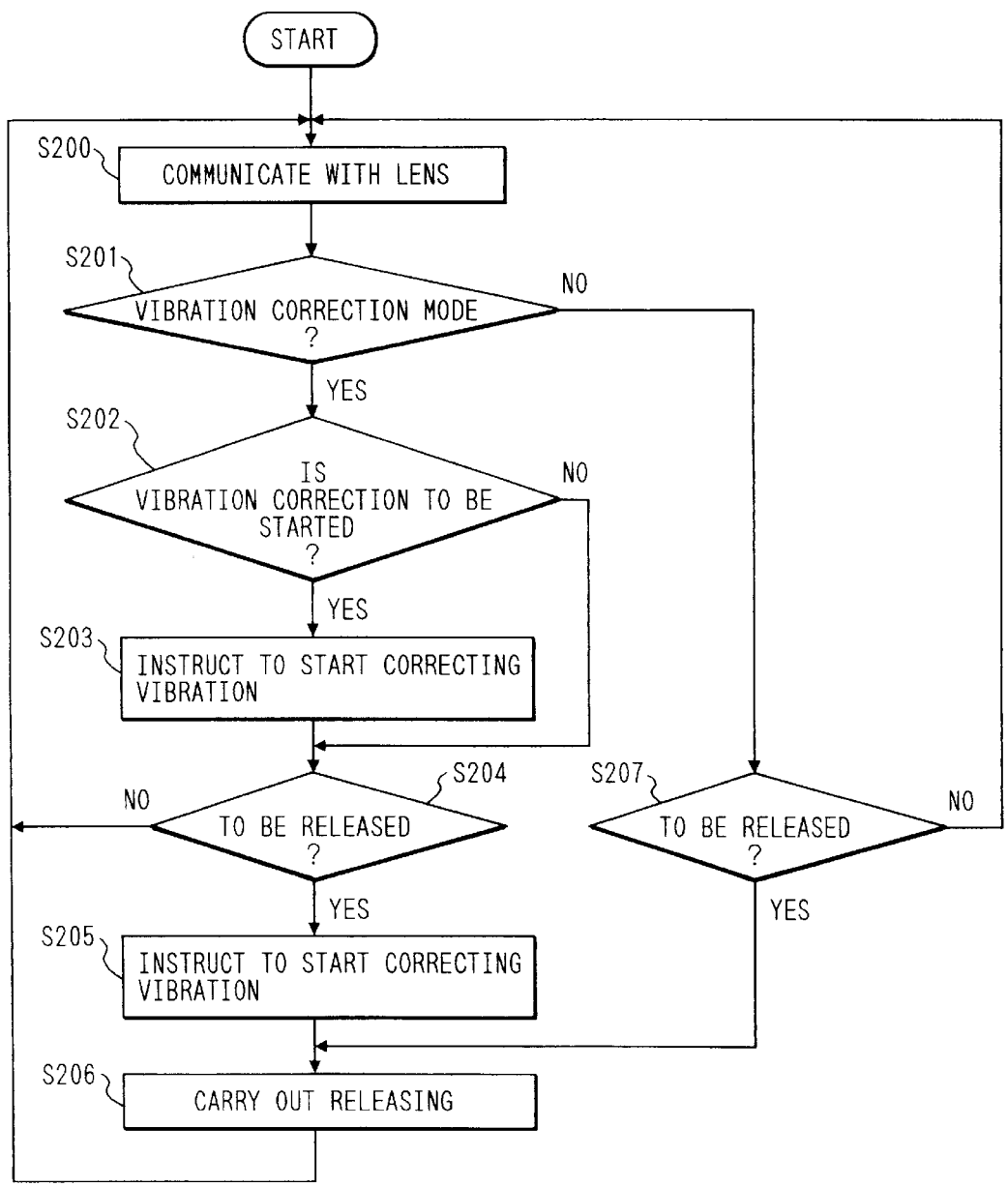

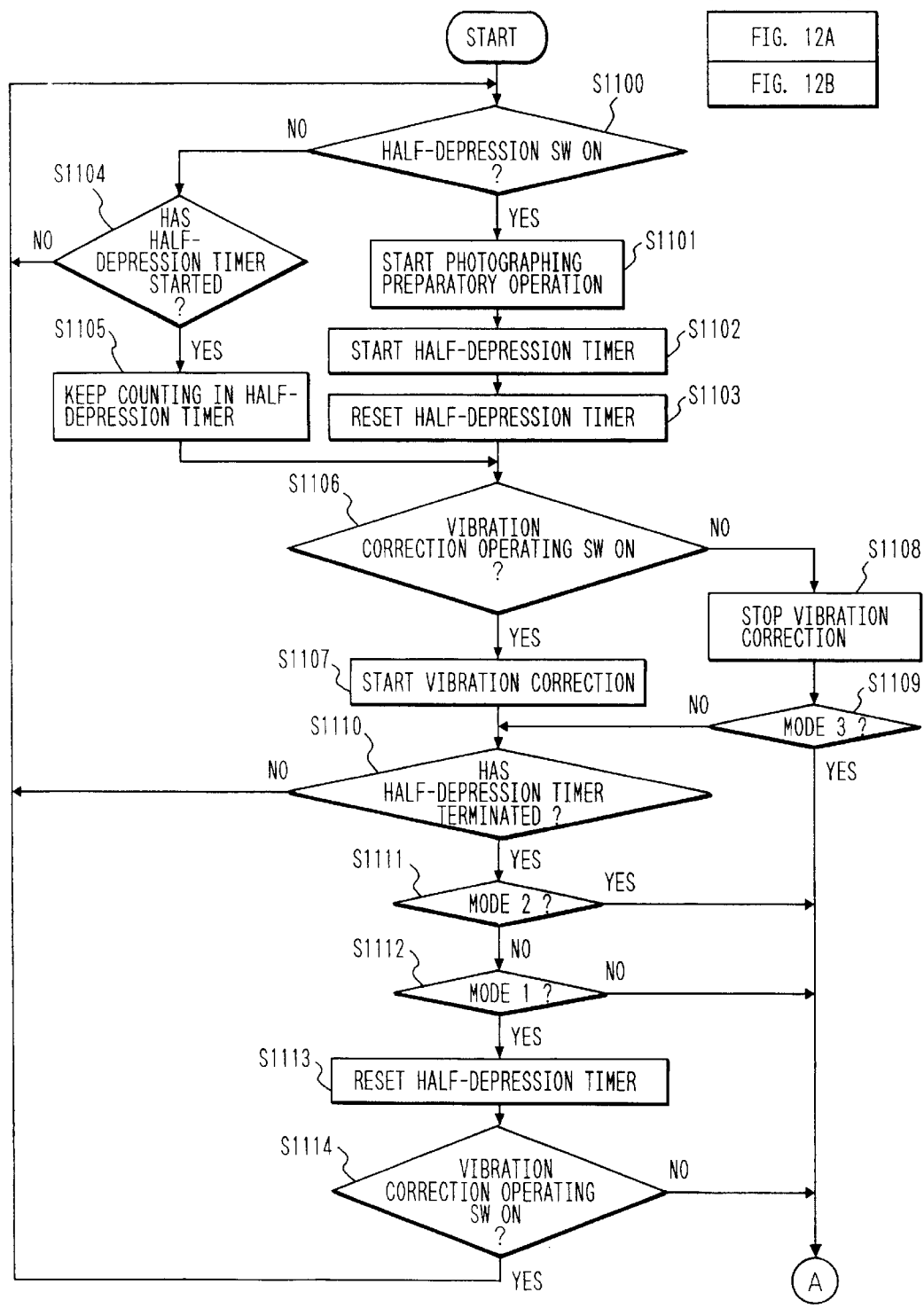

VIBRATION PREVENTING DEVICE AND PHOTOGRAPHING APPARATUS HAVING THE VIBRATION PREVENTING FUNCTION

BACKGROUND OF THE INVENTION

1. Field of the Invention

This invention relates to a vibration preventing device for detecting camera shake occurring before photographing and effecting the correction thereof, and a photographing apparatus having the vibration preventing function.

2. Related Background Art

Generally, when photographing with a camera held in hands, particularly when a lens of a long focal length is used or a low shutter speed is used, camera shake is liable to occur and thus, the quality of resulting photographs is spoiled. In order to prevent such camera shake and eliminate the deterioration of the quality of photographs, a vibration preventing device has been proposed.

FIG. 9 of the accompanying drawings shows the general construction of the vibration preventing device. In FIG. 9, the reference numeral 1 designates an interchangeable lens, and the reference numeral 2 denotes a camera body.

The interchangeable lens 1 has a photo-taking optical system comprising a fixed lens unit L1, a lens unit L2 movable in the direction of the optical axis thereof and governing focusing, and a vibration correcting lens unit L3 (a vibration correcting optical unit) adapted to shift in a direction perpendicular to the optical axis and effect vibration correction. Herein, the vibration correcting lens unit L3 assumes the construction of the rearmost lens unit of the photo-taking optical system, but is not restricted to this type of optical system.

A vibration detecting device 3 is comprised of a speed sensor or an angular speed sensor, and outputs a signal conforming to detected vibration. In FIG. 9, the vibration detecting device 3 is provided in the interchangeable lens 1, but in some cases, it is provided in the camera body 2.

A vibration correcting device 4 constitutes a shifting mechanism for moving the vibration correcting lens unit L3 on a plane perpendicular to the optical axis. The vibration correcting device 4 is not limited to one which shifts the vibration correcting lens unit in a direction perpendicular to the optical axis to thereby effect correction, but may be one which inclines the vibration correcting lens unit with respect to the optical axis to thereby effect correction.

A vibration controlling device 5 is provided in the interchangeable lens 1 and the memory portion thereof stores therein lens information such as a focal length and information about vibration correction. This vibration controlling device 5 controls the driving of the vibration correcting device 4 on the basis of the information stored in the memory portion thereof and the output of the vibration detecting device 3 to thereby effect vibration correction.

Such vibration correction is started by the operation of a vibration correction starting switch. As the vibration correction starting switch, there is known, for example, a construction provided on a manual focusing ring or a zoom ring (see Japanese Utility Model Application No. 4-62851).

However, in the above-described vibration proofing device according to the prior art, when the vibration correction starting switch is touched by mistake, vibration correction is sometimes started against a photographer's intention, and this has been very inconvenient during effecting a pan shot or the like.

Also, in the vibration preventing device according to the prior art, when a heavy lens is used, the position of the left hand holding that lens is naturally determined and there has been a case where operability is not preferable even though the vibration correction starting switch is provided on the manual focusing ring or the zoom ring.

On the other hand, as photographing apparatuses represented by cameras, ones provided with an autofocusing (AF) device have become popular. Further, it has been proposed to add a vibration preventing device for correcting camera shake during photographing in such an AF device. This vibration preventing device, as described above, is a device for detecting any fluctuation of the angle of the optical axis caused by camera shake or the like, and correcting the image vibration of a photographed image on the basis of the result of the detection, and as such device, there are known, for example, Japanese Patent Application Laid-Open No. 2-66535 (an example of a single-lens optical system), Japanese Patent Application Laid-Open No. 2-183217 (an example of the image correction by the shift of a portion of the photo-taking optical system of an internal focusing type telephoto lens), etc.

On the other hand, a half-depression timer has been carried on such a photographing apparatus. This half-depression timer is a device for starting a photographing preparatory operation by the closing of a half-depression switch, thereafter counting the time for which the OFF state of the half-depression switch continues, and stopping the photographing preparatory operation of the photographing apparatus when the counted time reaches a set time.

Also, this photographing apparatus has been provided with a vibration correction operating switch for instructing to start or stop vibration correction.

Further, there has been the possibility that when a vibration correction switch is inadvertently closed or the vibration correction switch is closed before the start of the photographing preparatory operation, a meaningless vibration correcting operation is performed to give birth to wasteful power source consumption.

In the above-described photographing apparatus according to the prior art, however, when vibration correction is selected by the vibration correction operating switch and the half-depression timer is started during the execution of vibration correction, the photographing preparatory operation of the photographing apparatus is stopped with the termination of the half-depression timer, but when vibration correction is to be stopped, it has been necessary for the user of the photographing apparatus to operate the vibration correction operating switch again to thereby stop vibration correction. This has led to the problem that the photographer's operation is cumbersome and moreover unnecessary electric power consumption takes place.

Also, when vibration correction is selected by the vibration correction operating switch and the half-depression timer is started during the execution of vibration correction and the half-depression timer is terminated, there is the possibility that in spite of vibration correction being effected, the photographing preparatory operation is terminated against the photographer's intention.

Further, the operation of stopping vibration correction and the timing for stopping could not be evenly determined by the photographer's level or liking.

SUMMARY OF THE INVENTION

It is an object of the present invention to provide a vibration preventing device which is free of the possibility of wrong operation and excellent in operability.

It is another object of the present invention to provide a photographing apparatus which can effect the stoppage or the extension of the stoppage of vibration correction without performing any complicated operation.

It is still another object of the present invention to provide a photographing apparatus which can simply select a mode for effecting the stoppage or the extension of the stoppage of vibration correction.

To achieve the above objects, according to a first aspect of the present invention, there is provided a vibration preventing device provided with a vibration preventing mode selecting portion capable of selecting a vibration preventing mode in which vibration prevention driving is effected at least during exposure and a non-vibration preventing mode, a vibration prevention start selecting portion for selecting whether vibration prevention control is to be started, and a vibration prevention driving start instructing portion for instructing to start vibration prevention driving even before the start of exposure when the vibration preventing mode selecting portion selects the vibration preventing mode and the vibration prevention start selecting portion selects the start of the vibration prevention control.

It is preferable that the vibration preventing start selecting portion operate only while it is extraneously operated.

Preferably, the vibration prevention start selecting portion is provided in a lens barrel. In this case, it is preferable that the vibration prevention start selecting portion be disposed near a manually operated ring and further, between a manual focus operating ring and a zoom operating ring. Or it is preferable that the vibration prevention start selecting portion be disposed near the center of gravity of the lens barrel. Also, it is preferable that at least two vibration prevention start selecting portions be disposed for a vertical position and for a horizontal position, respectively.

Further, the vibration prevention start selecting portion is preferably provided in the recess of the lens barrel. In this case, it is preferable that the tip end portion of the vibration prevention start selecting portion be substantially flush with the surface of a fixed member.

According to a second aspect of the present invention, there is provided a vibration preventing device provided with a vibration preventing mode selecting portion for selecting a first vibration preventing mode for effecting vibration prevention driving during exposure or a second vibration preventing mode for permitting vibration prevention driving before exposure, a vibration prevention start selecting portion for selecting whether vibration prevention control is to be started, and a vibration prevention driving start instructing portion for instructing to start vibration prevention driving when the vibration preventing mode selecting portion selects the second vibration preventing mode and the vibration prevention start selecting portion selects the start of vibration prevention control.

It is preferable that the vibration prevention start selecting portion operate only while it is extraneously operated.

Preferably, the vibration prevention start selecting portion is provided in a lens barrel. In this case, it is preferable that the vibration prevention start selecting portion be disposed near a manually operated ring and further, between a manual focus operating ring and a zoom operating ring. Or it is preferable that the vibration prevention start selecting portion be disposed near the center of gravity of the lens barrel. Also, it is preferable that at least two vibration prevention start selecting portions be disposed for a vertical position and for a horizontal position, respectively.

Further, the vibration prevention start selecting portion is preferably provided in the recess of the lens barrel. In this case, it is preferable that the tip end portion of the vibration prevention start selecting portion is substantially flush with the surface of a fixed member.

In the first and second aspects of the present invention, the vibration preventing mode and the vibration prevention start selecting portion are provided and the vibration prevention start selecting portion is disposed at a position which is preferable in operability and therefore, vibration correction is not started by mistake and its operability is good.

According to a third aspect of the present invention, there is provided a photographing apparatus provided with a vibration detecting unit for detecting camera shake, a vibration correcting optical system for moving at least a portion of a photo-taking optical system and effecting vibration correction, a vibration correction driving unit for driving the vibration correcting optical system and effecting vibration correction, a vibration correction control unit for controlling the operation of the vibration correction driving unit on the basis of the output from the vibration detecting unit, a vibration correction operating switch for setting whether vibration correction is to be effected, a photographing preparatory operating switch for setting whether a photographing preparatory operation is to be performed, and a photographing preparatory stop timer for counting the time for which the OFF state of the photographing preparatory operating switch continues after the photographing preparatory operation is set by the closing operation of the photographing preparatory operating switch, and stopping the photographing preparatory operation when the counted time reaches a set time, and the photographing apparatus is characterized in that vibration correction is stopped when during the execution of vibration correction, the counted time by the photographing preparatory stop timer reaches the set time.

It is preferable that when the photographing preparatory stop timer is started during the execution of vibration correction, the resetting of the photographing preparatory stop timer be effected by the closing of the photographing preparatory operating switch or the closing of the vibration correction operating switch. Or it is preferable that when the photographing preparatory stop timer is started during the execution of vibration correction, the resetting of the photographing preparatory stop timer be effected by the closing of the photographing preparatory operating switch and the photographing preparatory operation and vibration correction be stopped by the opening of the vibration correction operating switch.

Also, it is preferable that the photographing apparatus be further provided with a selecting switch capable of selecting a first mode in which when vibration correction is selected by the vibration correction operating switch and the photographing preparatory stop timer is started during the execution of vibration correction, the resetting of the photographing preparatory stop timer is effected by the closing of the photographing preparatory operating switch or the closing of the vibration correction operating switch, a second mode in which when vibration correction is selected by the vibration correction operating switch and the photographing preparatory stop timer is started during the execution of vibration correction, the resetting of the photographing preparatory stop timer is effected by the closing of the photographing preparatory operating switch, and a third mode in which when vibration correction is selected by the vibration correction operating switch and the photographing preparatory stop timer is started during the execution of vibration correction, the resetting of the photographing preparatory stop timer is effected by the closing of the photographing preparatory operating switch and the photographing preparatory operation and vibration correction are stopped by the opening of the vibration correction operating switch.

In the third aspect of the present invention, provision is made of the vibration correction operating switch for setting whether vibration correction is to be effected and therefore, the stoppage or the extension of the stoppage of vibration correction can be effected. Also, a mode selecting switch is provided so that one of the three vibration correction modes can be selected by the operation of the mode selecting switch and therefore, a user can easily select a vibration correction mode conforming to his necessity or liking.

The above and other objects, features and advantages of the present invention will be explained hereinafter and may be better understood by reference to the accompanying drawings and the descriptive matter which follows.

DESCRIPTION OF THE DRAWINGS

FIG. 4 is a flow chart showing the body operation of the vibration preventing device according to the first embodiment.

DESCRIPTION OF THE PREFERRED EMBODIMENTS

Figure 1:
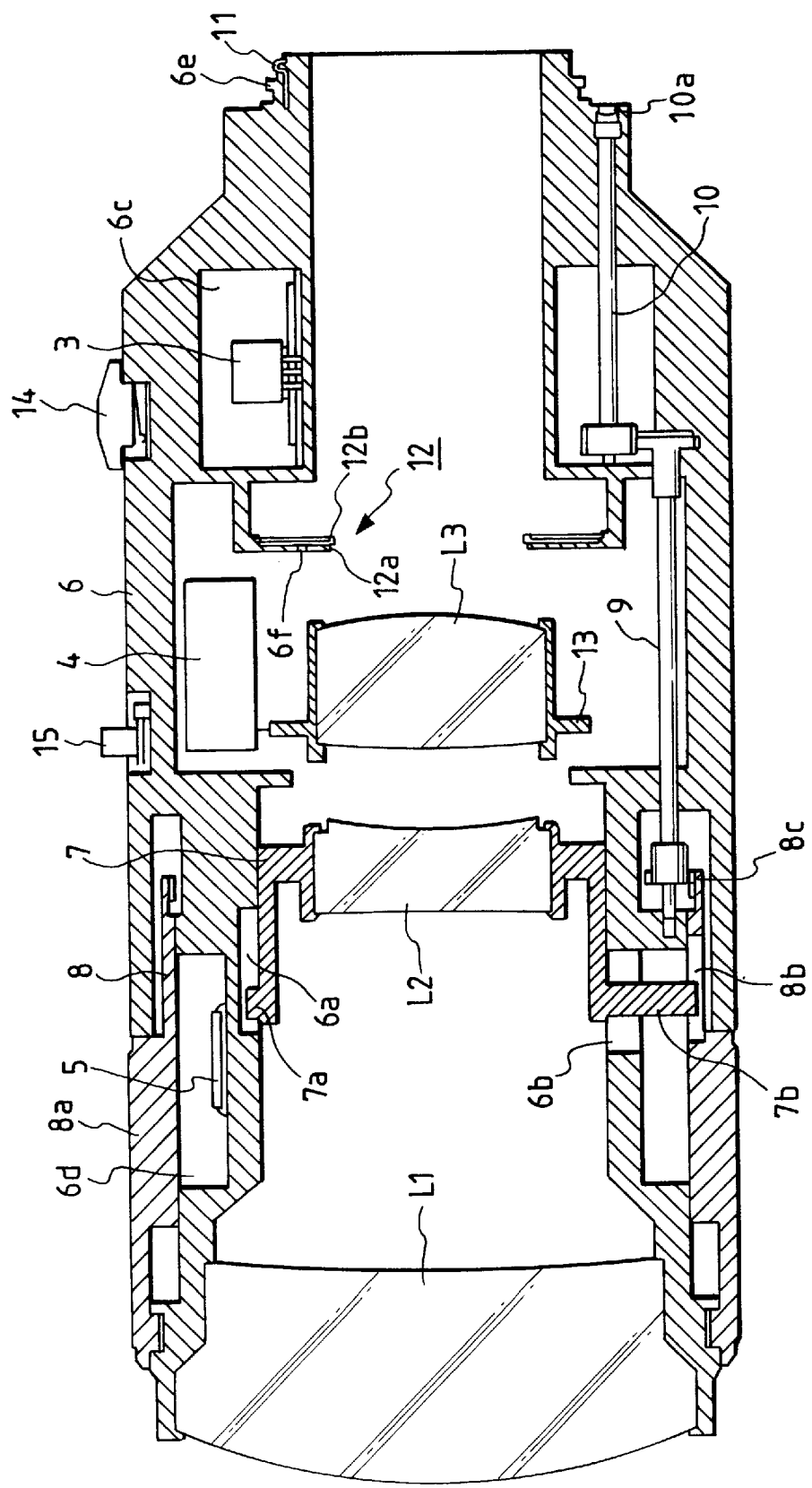
FIG. 1 is a cross-sectional view showing the construction of a first embodiment of a vibration preventing device according to the present invention.

FIG. 1 is a cross-sectional view showing the construction of an interchangeable lens incorporating therein a first embodiment of a vibration preventing device according to the present invention. In FIG. 1, portions functionally similar to those in the general construction shown in FIG. 1 are given the same reference numerals and need not be described.

A fixed lens barrel 6 holds a fixed lens unit L1 by its front side portion, and the holding frame 7 of a focusing lens unit L2 is slidably fitted in the bore thereof. A focusing driving ring 8 is fitted to the outer periphery of the fixed lens barrel 6, and the outer peripheral portion 8a thereof is exposed to the outer periphery of the lens and functions as a manual focusing ring.

The holding frame 7 has its rectilinear guide portion 7a engaged with a rectilinear guide groove 6a in the fixed lens barrel 6, and the focusing guide portion 7b thereof extends through the escape portion 6b of the lens barrel 6 and is engaged with a lead groove 8b in the focusing driving ring 8.

The focusing driving ring 8 is provided with a gear 8c in the rear end portion thereof, and is in meshing engagement with auto-focus driving gears 9 and 10. The rear end portion 10a of the gear 10 is of a coupler shape and is engaged with the coupler of a camera body, not shown, to thereby transmit an autofocus driving force.

Operation will now be described. When the coupler of the camera body is rotated, the rotation thereof is transmitted to the gears 10, 9 and 8c, whereby the focusing driving ring 8 is rotated. Since the focusing guide portion 7b is engaged with the lead groove 8b, the holding frame 7 moves in the direction of the optical axis along the inclination of the lead. Since the guide portion 7a is engaged with the rectilinear guide groove 6a, the holding frame 7 does not rotate but moves in the direction of the optical axis.

When manual focusing is to be effected, the outer peripheral portion (manual focusing ring) 8a of the focusing driving ring 8 is manually rotated to thereby effect the movement of the holding frame 7.

A vibration detecting unit 3 is housed in the disposition space 6c of the fixed lens barrel 6. A vibration control unit 5 comprises a one-chip microprocessing unit (hereinafter referred to as MPU 1) and is housed in the disposition space 6d of the fixed lens barrel 6.

The function of MPU 1 is to A/D-convert the output of the vibration detecting unit 3, calculate the value thereof, control a vibration correcting unit 4 and communicate with the camera body 2. The vibration correcting unit 4 is connected to the holding frame 13 of a vibration correcting lens unit L3.

The fixed lens barrel 6 is formed with a bayonet structure in the rear end portion 6e thereof and is mounted on the camera body 2. An electrical contact 11 is connected to a camera body side electrical contact, not shown, in a state in which it is mounted on the camera body 2, whereby the transmission of a signal and the supply of electric power are effected.

An aperture mechanism 12 is comprised of an aperture vane 12a, an aperture driving ring 12b, etc. The projected portion of the aperture vane 12a is engaged with a cam slot formed in the aperture driving ring 12b and a hole 6f formed in the fixed lens barrel 6. The rotation of the aperture driving ring 12b causes the rotation of the aperture vane 12a to thereby vary the aperture diameter.

A vibration correcting mode setting switch 14 is capable of setting two modes, i.e., a vibration correction ON mode and a vibration correction OFF mode, and effects vibration correction during exposure when it sets the mode to ON. A vibration prevention starting switch 15 is a switch by which vibration correction is effected when the switch is in its ON state.

Figure 2:
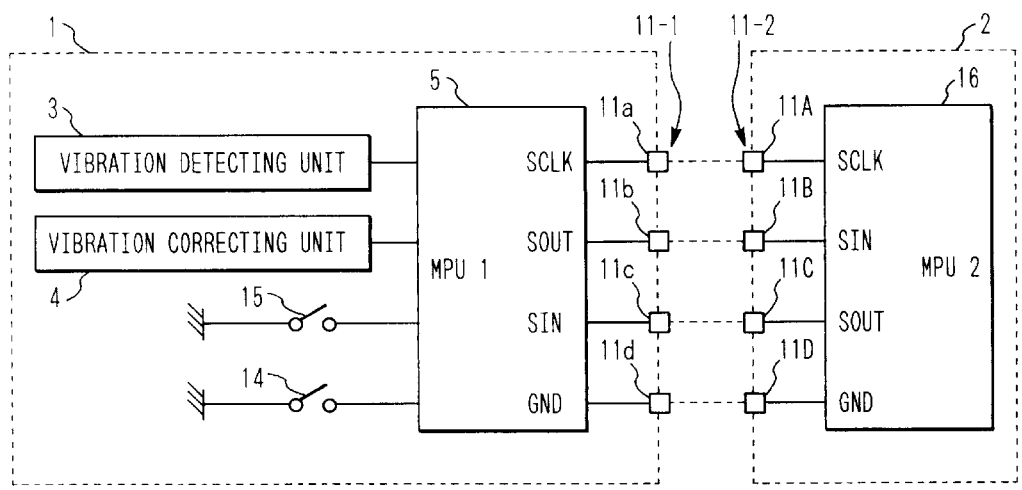
FIG. 2 is a block diagram showing the construction of the vibration preventing device according to the first embodiment.

FIG. 2 is a block diagram showing the constructions of a camera body and an interchangeable lens according to the first embodiment of the present invention.

As previously described, the interchangeable lens 1 is provided with the vibration detecting unit 3, the vibration correcting unit 4, the vibration correcting mode setting switch 14, the vibration prevention starting switch 15, etc., which are connected to the vibration control unit 5, which in turn is connected to an electrical contact 11-1.

The electrical contact 11-1 is provided with a contact 11a for clock, a contact 11b for data (lens side output), a contact 11c for data (lens side input) and a ground contact 11d.

The camera body 2 is provided with a camera control unit 16 comprising a one-chip microprocessing unit (hereinafter referred to as MPU 2) which effects communication with the lens and the exposure control of the camera. The control unit 16 is connected to an electrical contact 11-2.

The electrical contact 11-2 is provided with a contact 11A for clock, a contact 11B for data (body side input), a contact 11C for data (body side output) and a ground contact 11D.

When the interchangeable lens 1 is mounted on the camera body 2, the electrical contacts 11-1 and 11-2 are connected together and communication becomes possible.

Figure 3:
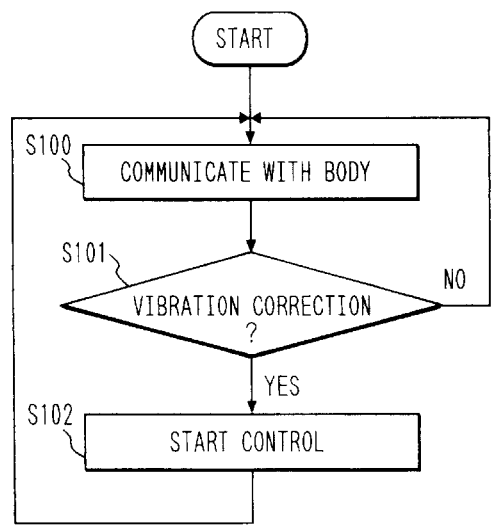
FIG. 3 is a flow chart showing the lens operation of the vibration preventing device according to the first embodiment.

FIG. 3 is a flow chart showing the operation of MPU 1 of the vibration preventing device according to the first embodiment.

At S100, the interchangeable lens 1 effects communication with the camera body 2. At S101, whether vibration correction is to be started is judged from the result of the communication, and when vibration correction is to be started, advance is made to S102. At S102, vibration correction control is started.

FIG. 4 is a flow chart showing the operation of MPU 2 of the vibration preventing device according to the first embodiment.

At S200, the camera body 2 effects communication with the interchangeable lens 1. At S201, a vibration correcting mode is judged from the result of the communication and whether vibration correction is to be done is judged, and if vibration correction is not to be done, advance is made to S207.

At S202, whether vibration correction is to be started is judged from the result of the communication. If vibration correction is to be started, advance is made to S203, and if vibration correction is not to be started, jump is made to S204. At S203, the judgment at S202 is received and communication is effected with the interchangeable lens 1 to thereby transmit the start of vibration correction.

Subsequently, at S204, whether release is to be done is judged. If release is not to be done, return is made to S200, and if release is to be done, advance is made to S205. At S205, communication is effected with the interchangeable lens 1 immediately before release to thereby transmit the start of vibration correction. At S206, release is executed.

On the other hand, at S207, whether release is to be done is judged, and if release is not to be done, return is made to S200, and if release is to be done, advance is made to S206, where vibration correction is not effected but release is executed.

As described above, the vibration correcting mode setting switch 14 is a switch performing the fundamental function of setting whether vibration correction is to be effected, and the vibration prevention starting switch 15 is a switch performing the function of setting whether vibration correction except during exposure is to be effected.

The vibration prevention starting switch 15 is provided near the position at which the lens barrel 1 is supported by the left hand when the camera is levelled, and is easily operable. If the lens barrel 1 is relatively light in its weight and the camera can be stably levelled even if the left hand is put near the operating ring including the manual focusing ring 8a, it is usual to put the left hand on this position, and the vibration prevention starting switch 15 can be provided near it.

Also, if the lens barrel 1 is heavy in its weight and the position on which the left hand is to be put to level the camera stably is determined irrespective of the position of the operating ring, the vibration prevention starting switch 15 can be provided near it. Thus, the vibration prevention starting switch 15 is provided near the center of gravity of the lens barrel 1.

Figure 5A:
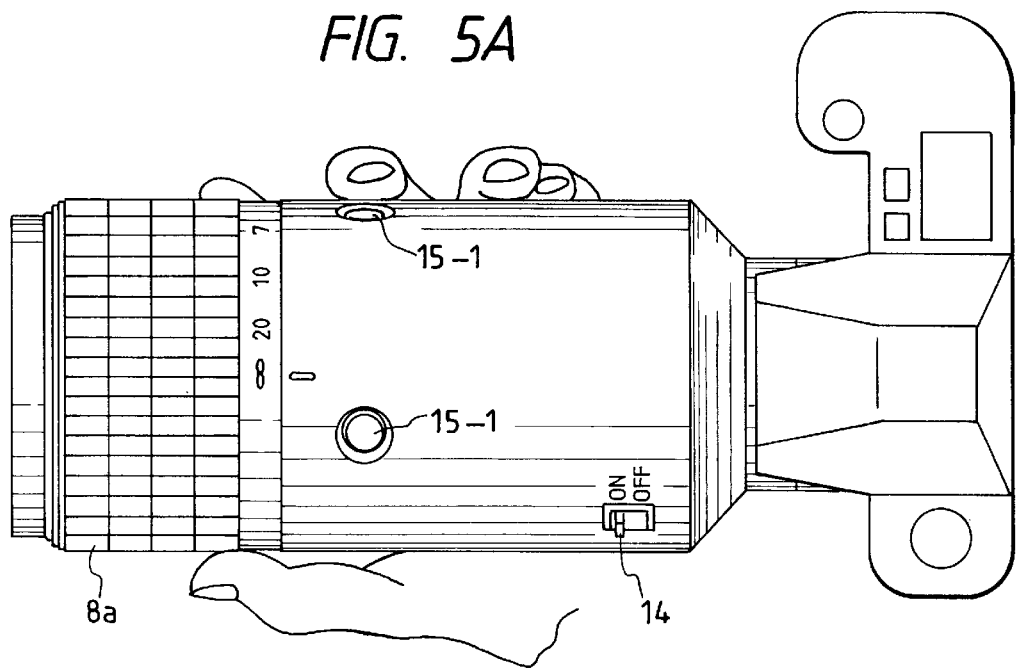
FIG. 5A shows the external appearance of the vibration preventing device according to the first embodiment.

FIG. 5A is a pictorial view showing the vibration preventing device according to the first embodiment. Vibration prevention starting switches 15-1 are provided at three locations near the center of gravity G of the lens barrel 1 so as to be operable in any of vertical position photographing and horizontal position photographing.

Figure 5B:
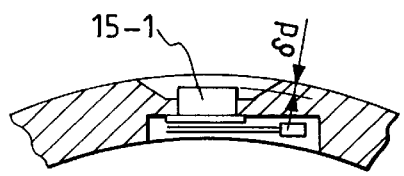
FIG. 5B is a fragmentary enlarged view of a vibration prevention starting switch.

FIG. 5B is a fragmentary enlarged view of the vibration prevention starting switch 15-1. The vibration prevention starting switch 15-1 has its tip end portion retracted by δd from the outer periphery of the lens barrel 1 so that it may not be inadvertently touched.

Figure 6A:
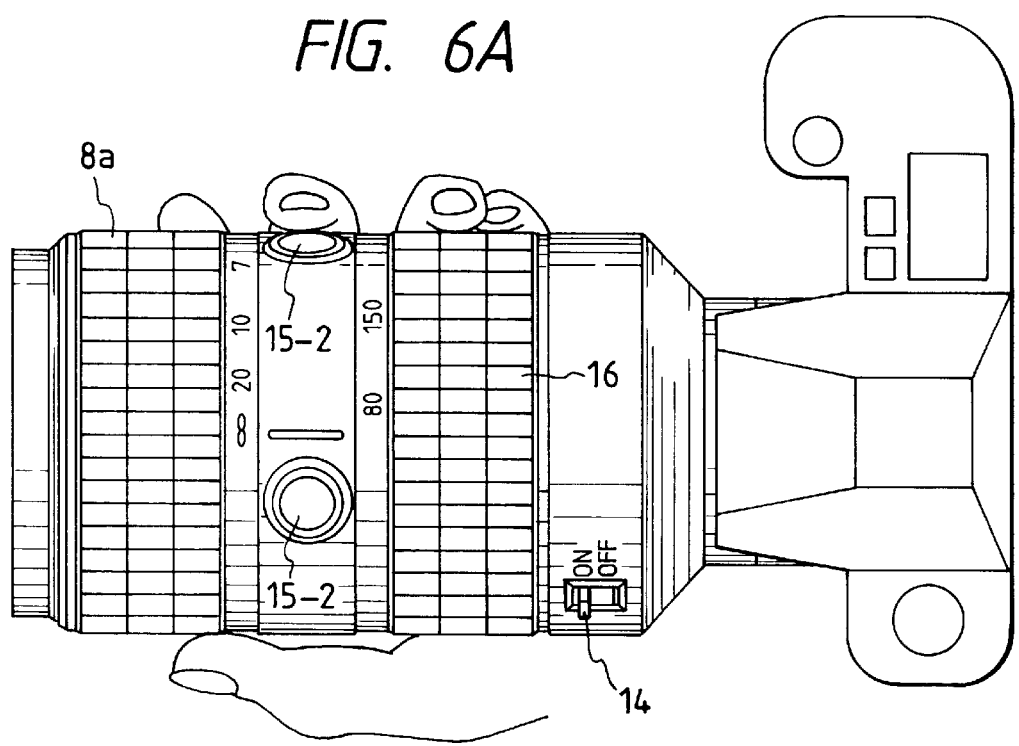
FIG. 6A shows the external appearance of the vibration preventing device according to the first embodiment when it is used in a zoom lens.

FIG. 6A is a pictorial view showing a case where the present embodiment is applied to a zoom lens. A vibration prevention starting switch 15-2 is provided between a manual focusing ring 8a and a zoom operating ring 16. The vibration prevention starting switch 15-2 is disposed near the center of gravity of the lens, and the manual focusing ring 8a and the zoom operating ring 16 are disposed with it interposed therebetween.

In a lens light in weight, even if the position at which the vibration prevention starting switch 15-2 is disposed is more or less far from the center of gravity of the lens, there will be no problem in operation.

Figure 6B:
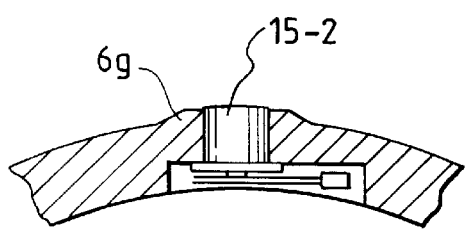
FIG. 6B is a fragmentary enlarged view of a vibration prevention starting switch.

FIG. 6B is a fragmentary enlarged view of the vibration prevention starting switch 15-2. The vibration prevention starting switch 15-2 is surrounded by a fixed member 6g and the tip end portion thereof is substantially flush with the surface of the fixed member 6g and therefore is not inadvertently touched.

Figure 7:
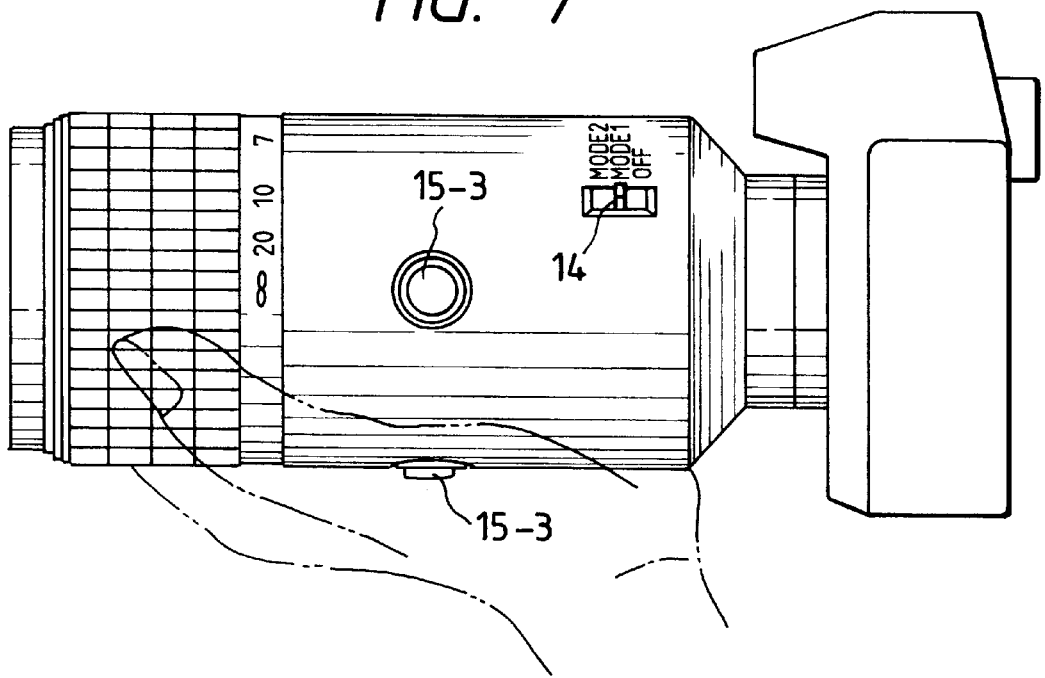
FIG. 7 is a pictorial view showing a second embodiment of the vibration preventing device according to the present invention.
Figure 9:
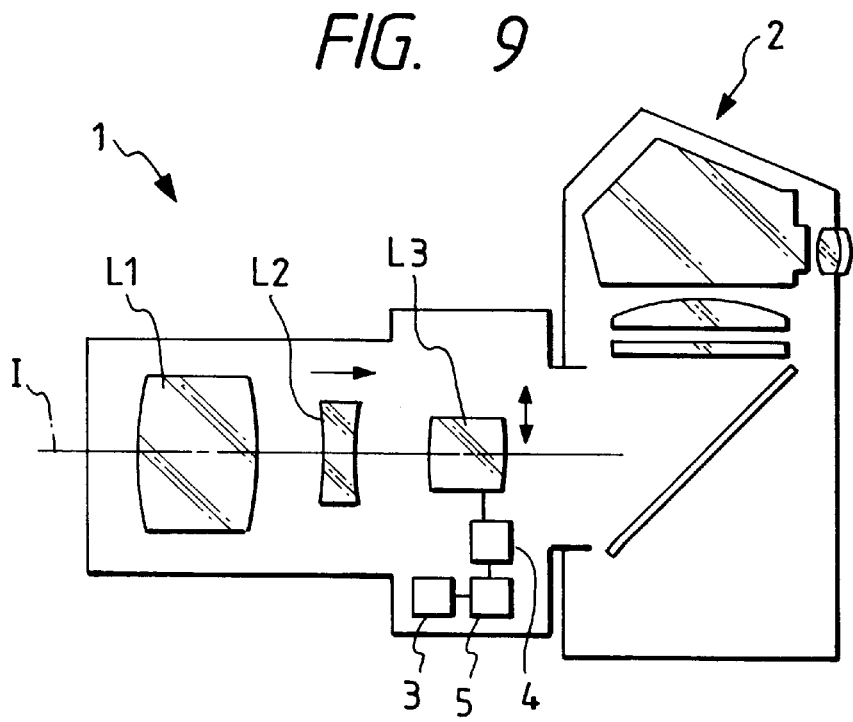
FIG. 9 shows the general construction of a vibration preventing device.

FIG. 7 is a pictorial view showing a second embodiment of the vibration preventing device according to the present invention.

The difference of the second embodiment from the first embodiment is that the vibration correcting mode setting switch 14 is capable of setting three modes, i.e., the vibration correction off mode, the during-exposure vibration correcting mode (mode 1) and the during-exposure and vibration prevention starting switch on vibration correcting mode (mode 2).

Also, a vibration prevention starting switch 15-3 is provided at a position whereat it can be operated by the palm of the left hand. This second embodiment can further reduce the possibility that the vibration prevention starting switch 15-3 is touched by mistake and vibration correction is started against the user's intention.

Figure 8:
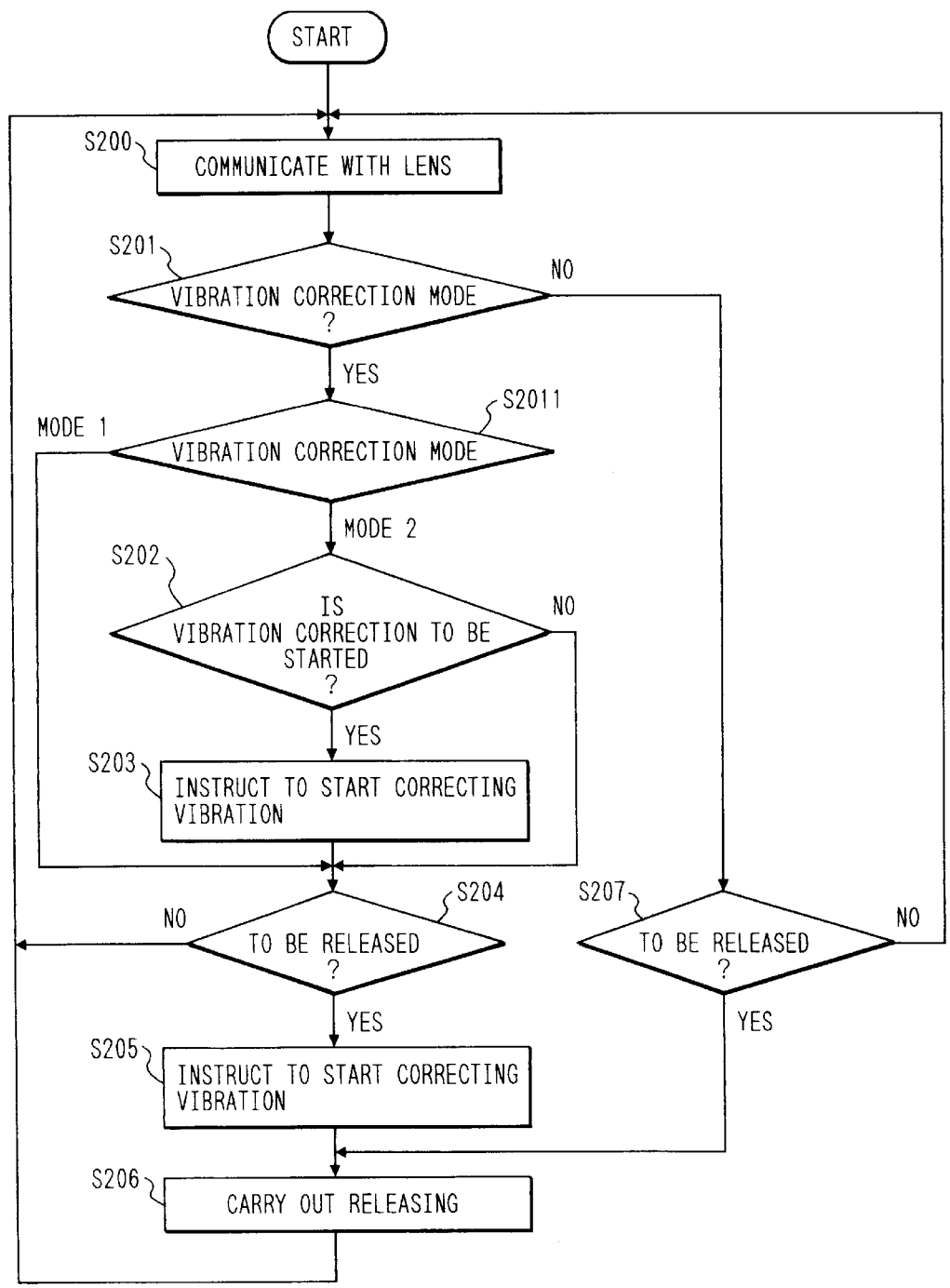
FIG. 8 is a flow chart showing the body operation of the vibration preventing device according to the second embodiment.

FIG. 8 is a flow chart illustrating the operation of the vibration preventing device according to the second embodiment. The operation flow of the interchangeable lens 1 is similar to that of the first embodiment (FIG. 3) and is therefore not shown.

In the second embodiment, at S201, the vibration correcting mode is judged from the result of the communication and whether vibration correction is to be done is judged, and if vibration correction is to be done, advance is made to S2011, where whether the mode is mode 1 or mode 2 is judged.

In the case of mode 2, as in the first embodiment, advance is made to S202. In the case of mode 1, jump is made to S204.

The other steps are substantially similar to those in FIG. 4 and therefore need not be described.

The vibration preventing device according to the present invention is not restricted to the above-described embodiments, but various modifications and changes are possible and they are also covered by the present invention.

The above embodiments have been described on the basis of a single-lens reflex camera, but the present invention can also be carried out in a lens shutter camera in which the camera and the lens are integral with each other.

In the above-described embodiments, the vibration detecting unit 3, the vibration control unit 5, the vibration correcting mode setting switch 14 and the vibration prevention starting switch 15 are installed in the interchangeable lens 1 and the control unit 16 instructing to start vibration correction is installed in the camera body 2, but the location of installation may be either.

Further, it is possible to change the sharing of the functions of the control units 5 and 16 or to coordinate those functions to thereby effect by a single MPU.

Furthermore, in the above-described first and second embodiments, the vibration prevention starting switch has been described in different forms with respect to the single-focus lens and the zoom lens, but of course, the combination thereof is free.

Description will now be made of an embodiment of a photographing apparatus according to the present invention.

Figure 10:
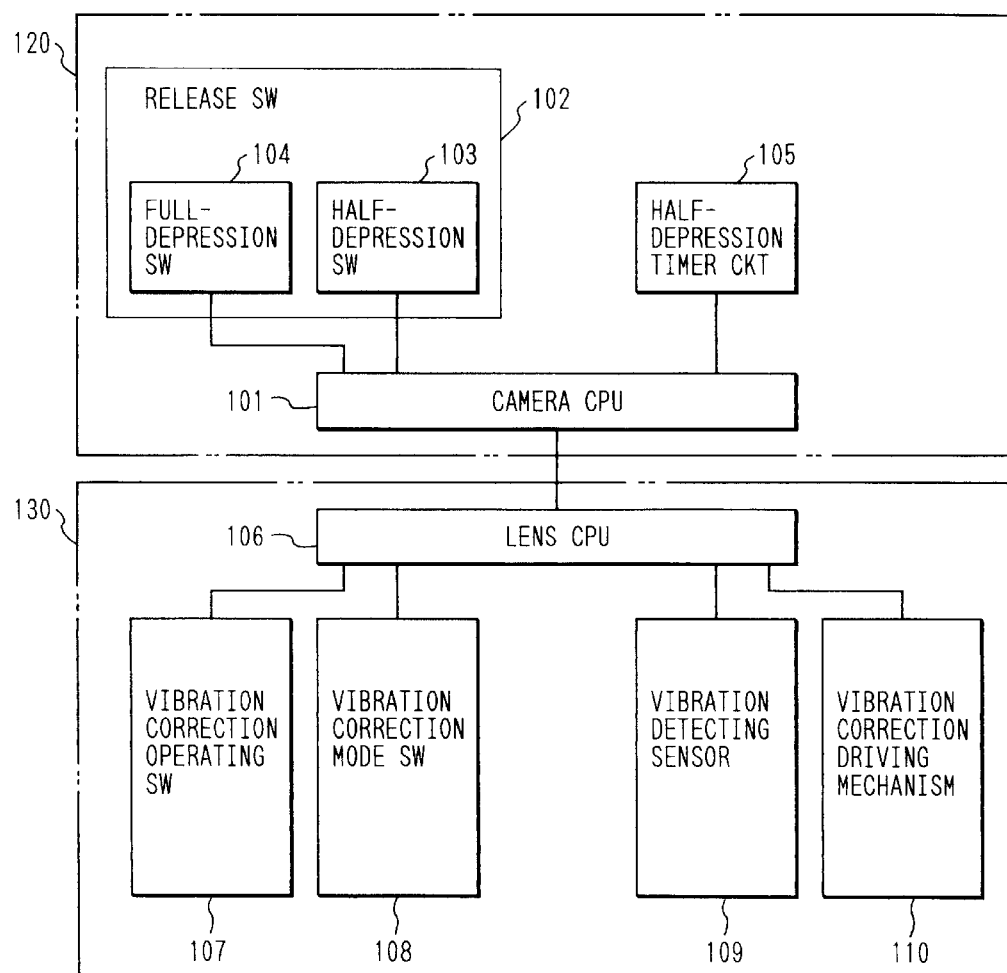
FIG. 10 is a block diagram showing an embodiment of a photographing apparatus according to the present invention.
Figure 11:
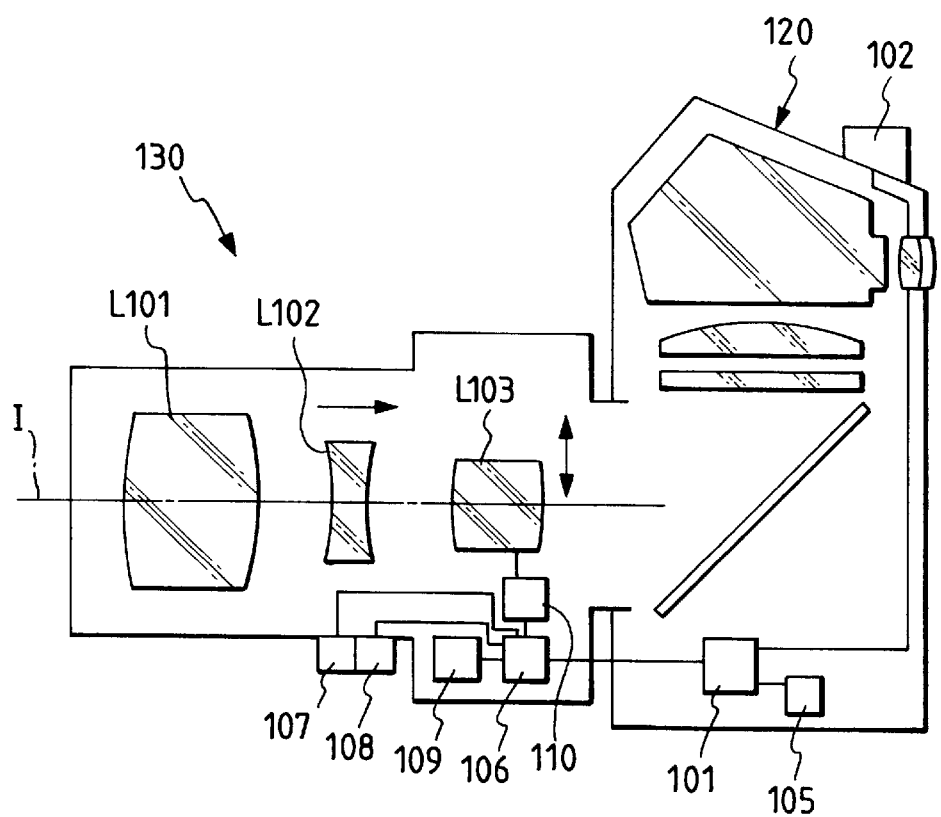
FIG. 11 shows the construction of an embodiment of the photographing apparatus according to the present invention.

FIGS. 10 and 11 are a block diagram and a construction view, respectively, illustrating an embodiment of the photographing apparatus according to the present invention.

The photographing apparatus of this embodiment is comprised of a camera body 120 and an interchangeable lens 130 which is removably mounted on the camera body 120. The photo-taking optical system of this interchangeable lens 130, as shown in FIG. 11, is comprised of a fixed lens unit L101, a lens unit L102 movable in the direction of the optical axis thereof to govern focusing, and a vibration correcting lens unit (vibration correcting optical system) L103 movable in a direction perpendicular to the optical axis I to effect the correction of vibration. Here, the vibration correcting optical system L103 assumes the construction of the rearmost lens unit of the photo-taking optical system, but is not restricted to this type of optical system.

A camera CPU 101 is a central processing unit for effecting the control of the entire camera, and can effect the communication of information necessary for control with a lens CPU 106.

A release switch 102 is a switch comprised of a half-depression switch 103 and a full-depression switch 104 which will be described later. The half-depression switch 103 is a switch adapted to become closed when the release switch 102 is half-depressed. The full-depression switch 104 is a switch adapted to become closed when the release switch 102 is fully depressed.

A half-depression timer circuit 105 is a circuit for counting, when the half-depression switch 103 has become closed and then opened, the time for which the half-depression switch 103 continuedly remained closed, and stopping the photographing preparatory operation of the camera when the counted time has passed a set time.

The lens CPU 106 is a central processing unit for effecting the control of the interchangeable lens 130 side, for example, vibration correction control or the like, and lens information such as the focal length and information about vibration correction are stored in the memory portion thereof. This lens CPU 106 controls the driving of a vibration correction driving mechanism 110 on the basis of the output of a vibration detecting sensor 109 and information stored in the memory portion thereof, thereby effecting vibration correction. Also, this lens CPU 106 can effect the communication of information necessary for control with the camera CPU 101.

A vibration correction operating switch 107 is a switch for setting whether vibration correction is to be executed.

A vibration correcting mode switch (selecting switch) 108 is a switch for setting the vibration correcting mode.

A vibration detecting sensor (vibration detecting portion) 109 is comprised of a speed sensor or an angular speed sensor, and outputs a signal in conformity with detected vibration. In FIG. 11, this vibration detecting sensor 109 is provided in the interchangeable lens 130, but may be provided in the camera body 120.

A vibration correction driving mechanism (vibration correction driving portion) 110 is a mechanism for moving the vibration correcting optical system L103 on a plane perpendicular to the optical axis I to thereby effect vibration correction.

Figure 12B:
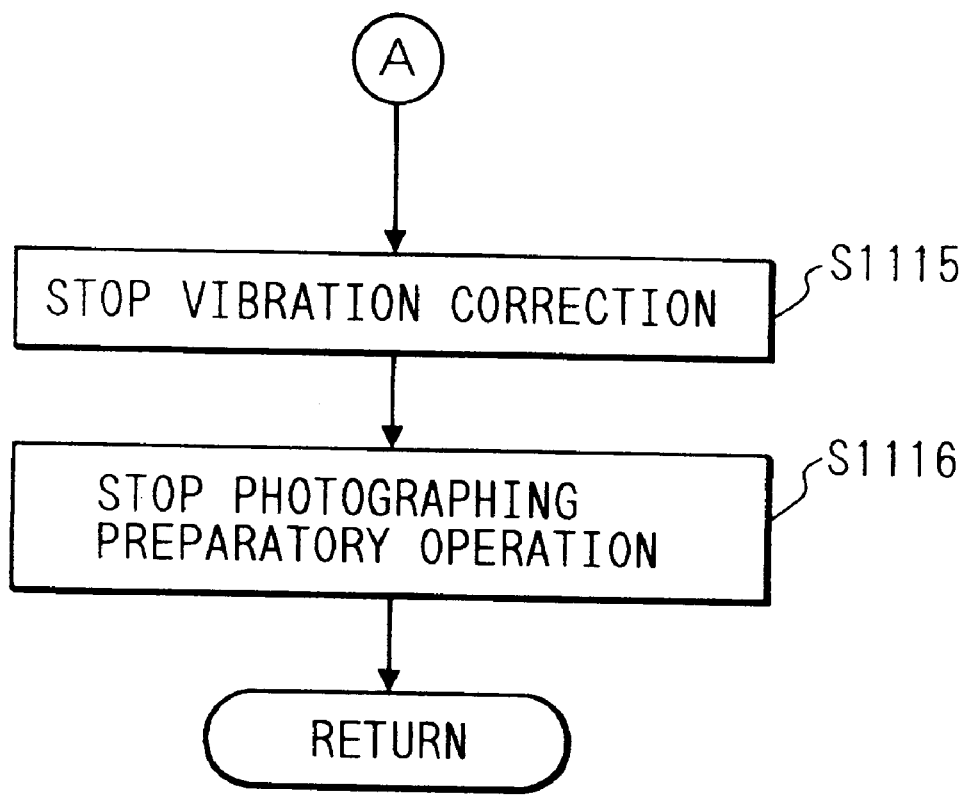
FIG. 12 is comprised of FIGS. 12A and 12B showing flow charts illustrating the processing routine of the photographing apparatus of FIG. 11.

FIGS. 12A and 12B are flow charts showing the processing routine of the embodiment of the photographing apparatus according to the present invention. This routine is repetitively executed as long as electric power is supplied.

The vibration correcting modes in the present embodiment will first be described.

Mode 1 is a vibration correcting mode in which when the half-depression timer has been started during the execution of vibration correction, the resetting of the counted time by the half-depression timer is effected by the closing of the half-depression switch 103 or the closing of the vibration correction operating switch 107.

Mode 2 is a vibration correcting mode in which when the half-depression timer has been started during the execution of vibration correction, the resetting of the counted time by the half-depression timer is effected by the closing of the half-depression switch 103.

Mode 3 is a vibration correcting mode in which when the half-depression timer has been started during the execution of vibration correction, the resetting of the counted time by the half-depression timer is effected by the closing of the half-depression switch 103 and the photographing preparatory operation and vibration correction are stopped by the opening of the vibration correction operating switch 107 independently of the counted time by the half-depression timer.

The stoppage of vibration correction may be any of a case where only vibration detection is stopped and a case where vibration detection and vibration correction driving are stopped.

At S1100, whether the half-depression switch 103 of the camera is ON is detected, and if it is ON, advance is made to S1101, and if it is OFF, advance is made to S1104.

At S1101, the photographing preparatory operation including photometric calculation, distance measurement calculation and AF driving by a conventional method is started. This step is passed if the photographing preparatory operation has already been started.

At S1102, the half-depression timer circuit 105 is started. This step is passed if the half-depression timer circuit 105 has already been started.

At S1103, the resetting of the counted time by the half-depression timer circuit 105 is effected.

At S1104, whether the half-depression timer circuit 105 has started is judged. If it has started, advance is made to S1105, and if it has not started, return is made to S1100.

At S1105, the counted time by the half-depression timer circuit 105 is advanced.

At S1106, whether the vibration correction operating switch 107 is ON is detected, and if it is ON, advance is made to S1107, and if it is OFF, advance is made to S1108.

At S1107, the vibration correction by the vibration correction driving mechanism 110 is started. This step is passed if the vibration correction driving mechanism 110 has already started vibration correction.

At S1108, the vibration correction by the vibration correction driving mechanism 110 is stopped. This step is passed if the vibration correction driving mechanism 110 has already stopped vibration correction.

At S1109, whether the vibration correction mode switch 108 is in mode 3 is detected, and if the vibration correcting mode is mode 3, advance is made to S1115, and if it is not mode 3, advance is made to S1110.

At S1110, the current counted time of the half-depression timer time of the half-depression timer circuit 105 and the counted time when the half-depression timer has terminated are compared with each other to thereby judge whether the half-depression timer termination time has been reached. If the half-depression timer has terminated, advance is made to S1111, and if the half-depression timer has not terminated, return is made to S1100.

At S1111, whether the vibration correcting mode switch 108 is in mode 2 is detected, and if the vibration correcting mode is mode 2, advance is made to step S1115, and if it is not mode 2, advance is made to S1112.

At S1112, whether the vibration correcting mode switch 108 is in mode 1 is detected, and if the vibration correcting mode is mode 1, advance is made to S1113, and if it is not mode 1, advance is made to S1115.

At S1113, the resetting of the counted time by the half-depression timer circuit 105 is effected.

At S1114, whether the vibration correction operating switch 107 is ON is detected, and if it is ON, return is made to S1100, and if it is OFF, advance is made to S1115.

At S1115 in FIG. 12B, the vibration correction by the vibration correction driving mechanism 110 is stopped. This step is passed if the vibration correction driving mechanism 110 has already stopped vibration correction.

At S1116, the photographing preparatory operation is stopped.

When the full-depression switch 104 has become ON, whatever step is executed, shift is made to the exposure operation (this need not be described).

Thus, when the half-depression timer has been started during the execution of vibration correction, the photographing preparatory operation and vibration correction are stopped with the termination of the half-depression timer and therefore, it becomes unnecessary for the user of the photographing apparatus to operate the vibration correction operating switch 107 again to stop vibration correction after the termination of the half-depression timer, thereby stopping vibration correction, and unnecessary power source consumption is eliminated.

Also, design is made such that when the execution of vibration correction has been selected, one of the three vibration correcting modes, i.e., mode 1, mode 2 and mode 3, can be selected by only the operation of the vibration correcting mode switch 108 and therefore, it becomes possible to select one of a plurality of vibration correcting modes by a simple operation.

The present invention is not restricted to the above-described embodiment, but various modifications and changes are possible and they are also covered by the present invention. While the present embodiment has been described on the basis of a single-lens reflex camera system comprising a camera body and an interchangeable lens, the present invention can also be carried out in a lens shutter camera in which the camera and the lens are integral with each other. Also, the present embodiment has been described with respect to a single-focus lens, but the present invention can also be carried out with respect to a zoom lens.

What is claimed is:

1. A photographing apparatus comprising:
   a vibration detecting unit to detect camera shake;
   a vibration correcting optical system to move at least a portion of a phototaking optical system and to effect vibration correction;
   a vibration correction driving unit to drive said vibration correcting optical system and to effect vibration correction;
   a vibration correction control unit to control the operation of said vibration correction driving unit on the basis of the output from said vibration detecting unit;
   a vibration correction operating switch to set whether vibration correction is to be effected;
   a photographing preparatory operating switch to set whether a photographing preparatory operation is to be performed; and
   a photographing preparatory stop time to count the time for which the closed state of the photographing preparatory operating switch continues after the photographing preparatory operation is set by the closing operation of said photographing preparatory operating switch, and to stop the photographing preparatory operation when the counted time reaches a set time;
   wherein vibration correction is stopped when, during the execution of vibration correction, the counted time by said photographing preparatory stop timer reaches the set time.

2. The photographing apparatus of claim 1, wherein when said photographing preparatory stop timer is counting during the execution of vibration correction, the resetting of said photographing preparatory stop timer is effected by the closing of said photographing preparatory operating switch or the closing of said vibration correction operating switch.

3. The photographing apparatus of claim 1, wherein when said photographing preparatory stop timer is counting during the execution of vibration correction, the resetting of said photographing preparatory stop timer is effected by the closing of said photographing preparatory operating switch.

4. The photographing apparatus of claim 1, wherein when said photographing preparatory stop timer is counting during the execution of vibration correction, the resetting of said photographing preparatory stop timer is effected by the closing of said photographing preparatory operating switch and the photographing preparatory operation and vibration correction are stopped by the opening of said vibration correction operating switch.

5. The photographing apparatus of claim 1, further provided with a selecting switch cable of selecting:

a first mode in which, when vibration correction is selected by said vibration correction operating switch and said photographing preparatory stop timer is counting during the execution of vibration correction, the resetting of said photographing preparatory stop timer is effected by the closing of said photographing preparatory operating switch or the closing of said vibration correction operating switch;

a second mode in which, when vibration correction is selected by said vibration correction operating switch and said photographing preparatory stop timer is counting during the execution of vibration correction, the resetting of said photographing preparatory stop timer is effected by the closing of said photographing preparatory operating switch; and a third mode in which, when vibration correction is selected by said vibration correction operating switch and said photographing preparatory stop timer is counting during execution of vibration correction, the resetting of said photographing preparatory stop timer is effected by the closing of said photographing preparatory operating switch and the photographing preparatory operation and vibration correction are stopped by the opening of said vibration correction operating switch.

6. A phototaking device, comprising:

a vibration prevention start switch provided on a lens barrel closable to start vibration prevention before an exposure operation;

a preparatory operation switch closable into a closed state to start a photographing preparatory operation; and a preparatory operation stop timer to count a time during which said preparatory operation switch is set in the closed state and to stop the photographing preparatory operation and the vibration prevention when the count time reaches a preset time.

7. A phototaking device as recited in claim 6, further comprising:

a vibration preventing mode selection portion to select a non-vibration preventing mode or a vibration preventing mode, wherein said vibration prevention start portion starts vibration prevention before the exposure operation when the vibration preventing mode is selected.

8. A phototaking device as recited in claim 7, wherein the vibration mode premits the resetting of the count time when said preparatory operation switch is closed or when said vibration prevention start switch is closed.

9. A phototaking device as recited in claim 7, wherein the vibration mode permits the resetting of the count time when said preparatory operation switch is closed.

10. A phototaking device as recited in claim 7, wherein the vibration mode permits the resetting of the count time when said preparatory operation switch is closed or when said vibration prevention start switch is opened after said vibration prevention start switch was closed.

\* \* \* \* \*